(12) United States Patent
Kapoor

(10) Patent No.: US 8,060,638 B1
(45) Date of Patent: *Nov. 15, 2011

(54) STREAMING MEDIA SEEK

(75) Inventor: Abhinav Kapoor, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/730,065

(22) Filed: Mar. 23, 2010

Related U.S. Application Data

(63) Continuation of application No. 12/575,230, filed on Oct. 7, 2009, now Pat. No. 7,702,805, which is a continuation of application No. 12/573,700, filed on Oct. 5, 2009.

(51) Int. Cl.
*G06F 15/16* (2006.01)

(52) U.S. Cl. ........................................................ 709/231

(58) Field of Classification Search .................. 709/231
See application file for complete search history.

(56) References Cited

U.S. PATENT DOCUMENTS 6,978,306 B2 * 12/2005 Miller et al. ................... 709/226
7,548,585 B2 * 6/2009 Kent et al. ................ 375/240.25

* cited by examiner

*Primary Examiner* — Kenny Lin
(74) *Attorney, Agent, or Firm* — Novak Druce + Quigg LLP

(57) ABSTRACT

Streaming media technology includes a back buffer configured to begin at a stream frame most recently played by the streaming media player. The back buffer continues, for each played frame of the stream, for a length determined by a nominal fill and an offset. In some embodiments, the offset is determined in runtime. In some embodiments the runtime-determined offset is determined by the position of a keyframe in the vicinity of the nominal fill. The keyframe in the vicinity of the nominal fill can be a keyframe next earlier, next later, or nearest in the stream to the location of the nominal fill.

19 Claims, 4 Drawing Sheets

STREAMING MEDIA SEEK

CROSS REFERENCE TO RELATED APPLICATIONS

This application is a continuation of U.S. patent application Ser. No. 12/575,230, of the same title, filed Oct. 7, 2009 now U.S. Pat. No. 7,702,805; which is a continuation of prior U.S. patent application Ser. No. 12/573,700, of the same title, filed Oct. 5, 2009.

FIELD OF THE TECHNOLOGY

The technology disclosed herein relates to control of streamed media.

BACKGROUND

Referring to FIG. 1, "streaming" refers to the process of delivering serialized information 110, especially encoded sound, video, or multimedia (referred to herein as a "stream"), in a more or less steady and more or less ordered flow that the recipient, e.g., a client/player 120, can access as the stream 110 is being transmitted, e.g., after intermediate storage in a buffer 130. The word "streamed" is usually applied to information distributed over information technology (IT) networks, as most other delivery systems are either inherently streaming (e.g., broadcast radio and television) or inherently non-streaming (e.g., books, video cassettes). While the inherently streaming media are primarily deterministic in nature, the communications medium for streaming over IT networks, e.g., wired and wireless portions of the Internet and 3G wireless communications infrastructure, are less deterministic and more subject to variable connectivity.

Streaming is typically conducted using a stream server 140 that delivers the stream 110 as a series of messages to the client 120. The server 140 and the client 120 exchange command and status information 150, typically via the same communication media used for delivering the stream 110. Examples of video formats for streamed information include Adobe Flash® Video (FLV), Apple Computer Quicktime™ video, Microsoft Windows™ Media Video (WMV), and Real Networks Inc. Realvideo™. The client 120 typically is at some distance from the server 140.

Typically to begin a stream, the client 120 transmits to the stream server 140 a command 150, specifying the content and a position within the content from which to begin streaming. This causes the server 140 to begin streaming information 110 to the client 120. When a threshold amount, e.g., $t_f$, of the information 110 has been downloaded to a buffer 130 in volatile memory at the client 120, the client 120 begins playing the content, e.g., from $t_0$ by positioning a playhead 122 of the client at $t_0$ and playing in the direction of $t_m$. Typically, based on exchange of command and status information 150 between the client 120 and the server 140, the server 140 attempts to keep the buffer 130 supplied with sufficient data so that normal speed playback can be sustained. However, to conserve server processing resources and communications channel bandwidth, the client 120 and the server 140 also cooperate to prevent the buffer 130 from being filled beyond a maximum size $t_m$. At the client 120, the stream 110 is played in order without permanent storage of the stream 110 by the client, e.g., no stream content is shown in FIG. 1 to the reverse side of the playhead 122.

SUMMARY

The technology includes methods, systems, and computer program products for streaming media. The technology includes a back buffer configured to begin at a stream frame most recently played by the streaming media player. The back buffer continues, for each played frame of the stream, for a length determined by a nominal fill and an offset. In some embodiments, the offset is determined in runtime. In some embodiments the runtime-determined offset is determined by the position of a keyframe in the vicinity of the nominal fill. The keyframe in the vicinity of the nominal fill can be a keyframe next earlier, next later, or nearest in the stream to the location of the nominal fill.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

Figure 1:
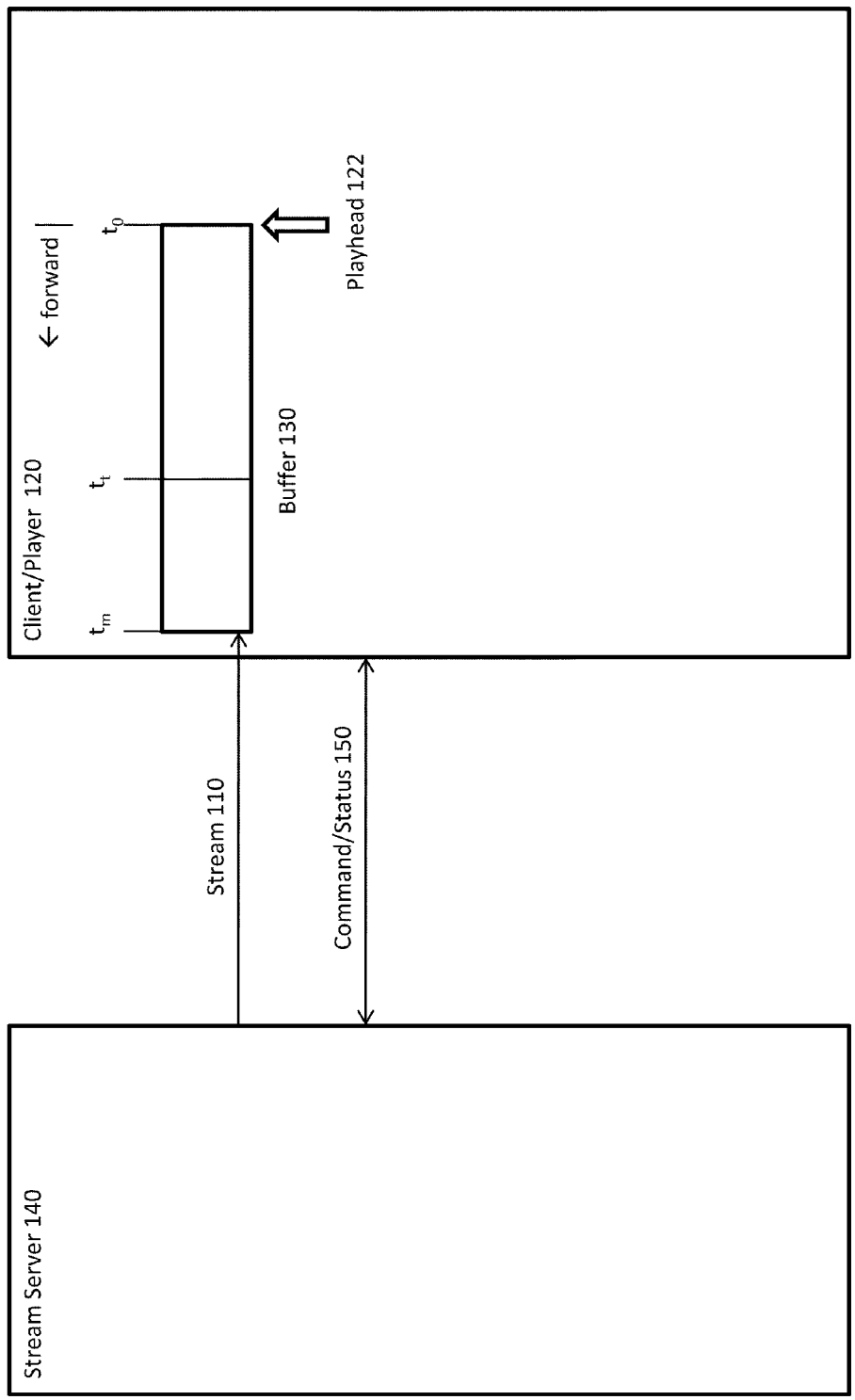
FIG. 1 illustrates aspects of legacy streaming technology.

Referring again to FIG. 1, one issue at the client 120 with respect to conventional streaming is that certain media player actions, e.g., seek and pause, discard the buffer 130 contents. When a client seeks to a new position, e.g., $t_x$, (not shown since it can be to a location either within or outside the buffer 130) in the stream, the buffer 130 is emptied and the server 140 begins filling the buffer from scratch until $t_x+t_f$ amount of stream data occupies the buffer 130; at which point the client 120 begins playing the stream again with the playhead 122 at position $t_x$. This conventional approach uses server 140 processor resources, uses bandwidth through the communications channel between the server 140 and the client 120, and causes re-buffering that most users find annoying. This issue also arises on movement of a "scrub bar" in clients 120.

Some non-streaming approaches such as download-and-play solutions, e.g., Tivo Digital Video Recorder (DVR), do not re-download the data from a server on seek. Such solutions save the data on a local disk. If the user wants to seek backwards, the data is obtained locally from the disk for the new location; however the buffer is flushed and reloaded. This download-and-play approach does not provide the same seek capabilities as the present technology since it still flushes the buffer and must load new data from the disk. Such loading encounters disk I/O routines that introduce latency. Accessing the local disk for modes such as fast forward, rewind or slow motion functions, would make these operations choppy and not as smooth as if all the operations are done with data in the memory directly addressable by the processor executing the media player. The DVRs normally provide fast forward and rewind operations by only showing the keyframes and hence such functions are not smooth.

In addition, DVR technology can seek forward only to the point where the data has already been downloaded. There is no handshaking with a streaming server to request data farther forward into the stream as a user calls for fast forward, which may need accelerated delivery. Downloading the data presents its own issues with security as the content can more easily be stolen. Further, approaches that do not account for the effect of keyframes can result in unusable buffer portions.

Often, the target of a seek operation is either within the client's buffer 130 or recently flushed by the client 120 after playing. The present technology avoids re-buffering the stream data 110 if the data for the new seek location is in the player's buffer and hence allows for faster seek operation, saving bandwidth usage and keeping the buffer ready for playback. The present technology delays flushing buffer contents that have recently been played, e.g., includes a back buffer, to allow for seeking back to the extent of the buffer.

The technology enables VCR style modes such as forward, rewind in fast or slow modes, which otherwise were difficult to implement in steaming, at least in part because of bandwidth and latency concerns.

The technology enables stream seeking for mobile players, portable devices, and other resource-constrained devices. The behavior is similar to that of a desktop implementation except that the default buffer caching for backward seeking can be smaller than the desktop. E.g., a default back buffer size on a desktop client can be thirty seconds; on a mobile device it can be three seconds.

A faster approach to seeking during a streaming media session is presented. Besides providing faster seek than buffer-dump approaches, it helps save bandwidth by reducing bandwidth wastage on seek operations. The technology also allows seek backwards without downloading new data from the server or local disk if the seek target is in the nonvolatile buffer (now extended in the back direction).

Figure 2:
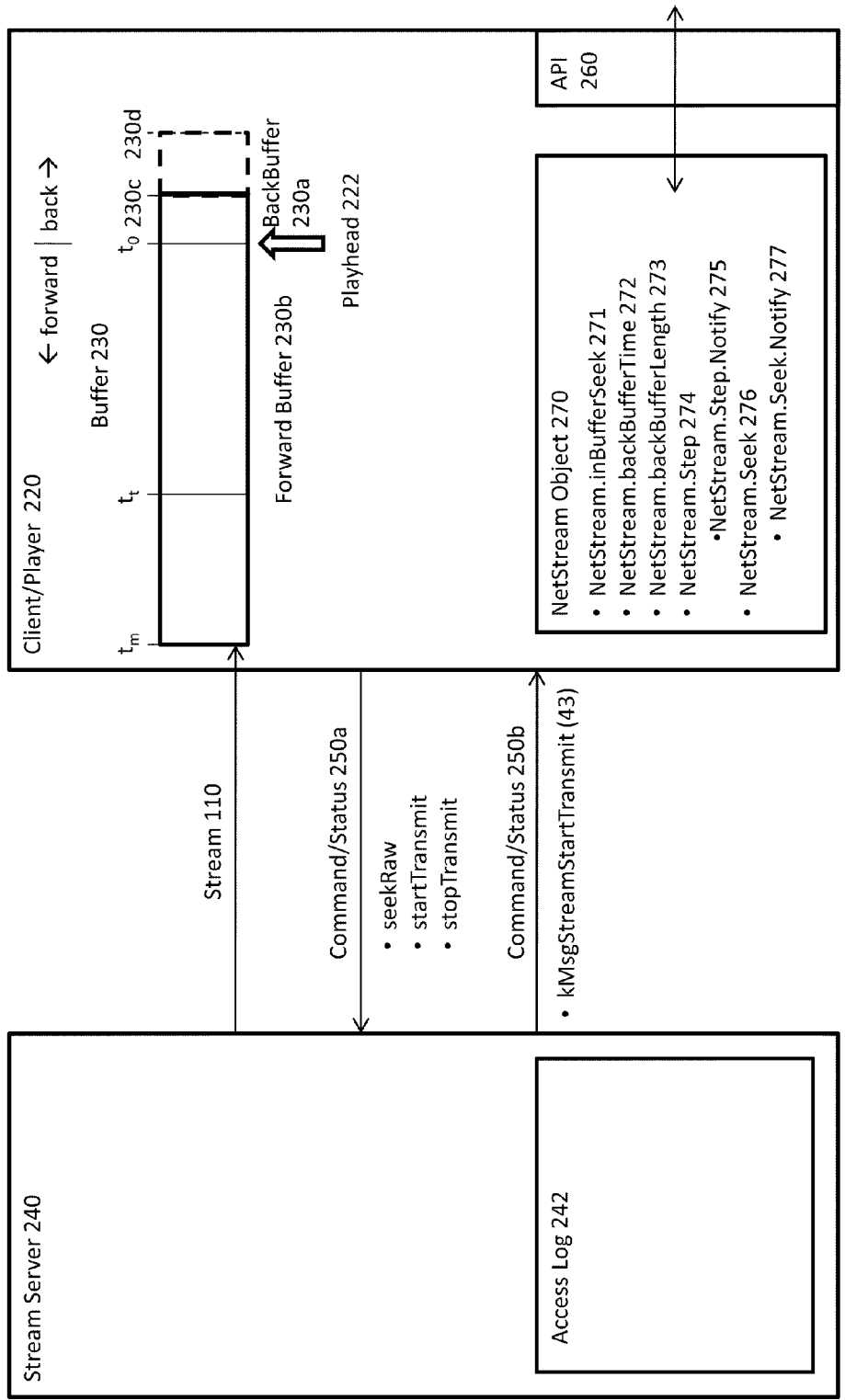
FIG. 2 illustrates modifications to legacy streaming technology.

Principles of the technology can be applied to modify existing streaming systems, to design a new streaming system, and to practicing the technology in a modified or new streaming system. FIG. 2 illustrates the context of modifications that can be applied to Adobe® Flash® technology including the Flash® Media Server and Flash® Player to implement the present technology. Before modification the stream server 240 and the stream client 220, e.g., the media player 220, collectively implement functionality such as that found in Adobe® Flash® Media Server prior to version 3.5.3 and Adobe® Flash® Player prior to version 10.1 respectively. While Adobe products are used as the basis for the following examples, the present technology can be used in conjunction with, or to modify, any conventional media server/media client or player environment.

Referring to FIG. 2, in addition to interfaces with the server 240 for stream 110 and control/status 250, the client 220 offers both an end user interface through a graphical user interface (GUI) (not shown) and an application programming interface (API) 260 that gives access to data objects, operations on the data objects, and event notifications. The present technology can be implemented in such an environment by providing additional commands, events, control messages, additional properties for existing objects, and modifications to logging of events.

Embodiments of the technology applied as a modification to existing Adobe® Flash® technology add configurable characteristics, operations, and event logging to the NetStream object 270. In some embodiments, the NetStream data object 270 has a one-to-one correspondence with the combined front and back buffers.

NetStream.inBufferSeek 271 is a get/set (e.g., read/write) characteristic of the NetStream object 270. NetStream.in BufferSeek 271 can take on two values, e.g., true, false. If true, then the client 220 is enabled to seek within the buffer 230 described herein; if false, then the client 220 reverts to buffer dump on seek operation as per the legacy technology.

NetStream.backBufferTime 272 is a get/set characteristic of the NetStream object 270 that specifies the nominal fill 230c (e.g., time in seconds) of the back buffer 230a. Together with size of the forward buffer 230b (characterized, e.g., by $t_m$-$t_0$), playhead position 222, and size of the threshold ($t_t$) required to begin play, NetStream.backBufferTime 272 configures the buffer 230. NetStream.backBufferTime 272 can have a default value. The default value can be larger for devices with larger memory, e.g., 30 seconds for desktop computers with significant random access memory (RAM), and smaller for devices with less memory, e.g., 3 seconds for handheld devices such as personal digital assistants (PDAs) and cell phones.

Back buffer nominal fill can be set to zero. That will keep the back buffer disabled and hence no cost in terms of memory, while still leveraging seeking within the buffer for forward seeking. The nominal fill of the back buffer can be device dependent.

The back buffer can begin at the stream frame most recently played by the client/player 220. The fill size of the back buffer can be variable, e.g., nominal fill 230c modified by an offset 230d determined in run time. The offset determined in run time can be in relation to the location of a keyframe in the vicinity of the nominal fill. In a first set of embodiments the fill size of the back buffer can be the larger of: 1) the nominal fill (where nominal fill is a predetermined time, number of frames, or some other measure of buffer length), and 2) nominal fill plus the fill (e.g., time, number of frames, frame identifier) required to include the keyframe next earlier in the stream than the nominal fill.

Referring to Table 1, and example of fill size of a buffer at one second intervals over time after playback begins, with backBufferTime=3 seconds, while processing a stream with keyframes every four seconds starting at time=0 seconds is shown. At 3 seconds, the nominal fill size set by backBufferTime is met and rendering of the intermediate frames in the buffer still need keyframe K1. A new keyframe will enter the backbuffer at t=5 seconds. However, the backBufferTime still retains portions of intermediate frames that rely on keyframe K1 for rendering. Therefore, keyframe K1 and the intervening intermediate frames remain in the back buffer. At t=7 seconds, there are no remaining intermediate frames in the backBufferTime portion of the back buffer that require keyframe K1 for rendering. The technology can flush those frames from the back buffer.

TABLE 1

| Time (sec.) after starting playback | Back Buffer Fill Size (sec.) | Back Buffer Contents K <x> = Key frame x I < x, y > = Intermediate frame y related to Key frame x |
|---|---|---|
| 0 | 0 | — |
| 1 | 1 | K1 |
| 2 | 2 | K1,I1 |
| 3 | 3 | K1,I1,I2 |
| 4 | 4 | K1, I1,I2,I3 |
| 5 | 5 | K1, I1, I2,I3,K2 |
| 6 | 6 | K1, I11, I12, I13,K2,I21 |
| 7 | 3 | K2,I21,I22 |
| 8 | 4 | K2, I21,I22,I23 |
| 9 | 5 | K2, I21, I22,I23,K3 |
| 10 | 6 | K2, I21, I22, I23,K3,K31 |
| 11 | 3 | K3,K31,K32 |
| 12 | 4 | K3, K31,K32,K33 |
| 13 | 5 | K3, K31, K32,K33,K4 |
| 14 | 6 | K3, K31, K32, K33,K4,K41 |

In some embodiments the fill size of the back buffer can be the smaller of 1) the nominal fill, and 2) the nominal fill minus the length required to include the keyframe next later in the stream than the nominal fill. In some embodiments the fill size of the back buffer can be the selectable larger/smaller of the nominal fill and the time required to include the keyframe nearest to the nominal fill, whether before or after the nominal fill.

NetStream.backBufferLength 273 is a get characteristic of the NetStream object that describes the current length of the back buffer.

NetStream.Step(# frames) 274 calls for the client 220 to step through the specified number of frames in the NetStream object 270 relative to the current frame at the playhead position 222. A negative number of frames indicates step(s) backward. Netstream.Step.Notify 275 is called to log a successful NetStream.setp(# frames) 274 operation. If NetStream.step(# frames) 274 is invoked and NetStream.Step.Notify 275 is not present, then either the step is outside the current buffer 230 or a supported server has not been found. Stated another way, NetStream.Step.Notify is called when a step seek is performed, but if a supported server is not found or there was insufficient amount of data in the buffer, then the event is not triggered. If any of the specified number of frames is outside the current buffer 230, the operation will fail and no event is logged on the client 220.

NetStream.Seek(time) 276 calls for the client 220 to seek to a specific time in the stream 110. Netstream.Step.Notify 275 is called to log a successful NetStream.Seek(time) 276 operation. If NetStream.Seek(time) 276 is invoked and NetStream.Step.Notify 275 is not present, then either the seek time is outside the current buffer 230 or a supported server has not been found. Stated another way, NetStream.Step.Notify is called when a step or seek is performed, but if a supported server is not found or there was insufficient amount of data in the buffer, then the event is not triggered. If any of the specified number of frames or time is outside the current buffer 230, the operation will fail and no event is logged on the client 220.

While the client 220 does not directly rely on the server 240 for seek operations to play from frames already stored in the client's buffer 230, the client 220 can rely on the stream server 240 for several reasons including keeping track of which frames to stream, when to pause or stop streaming, when to start streaming, and when to not call for a buffer dump. In addition to the control/status messages 150 passed between the legacy stream server 140 and the legacy client 120, and the events logged by the legacy server 140, embodiments of the present technology provide commands 250a, 250b between the client 220 and the server 240, and server 240 processing of commands and server event logging.

For seek or step to frames within the client 220 back buffer 230a, e.g., $t_{seek1}$, the client 220 sends a seekRaw (time) command to the server 240. This command is for logging the client 220 seek event in an access log 242 on the server 240 as described below with regard to the server 240.

Figure 3:
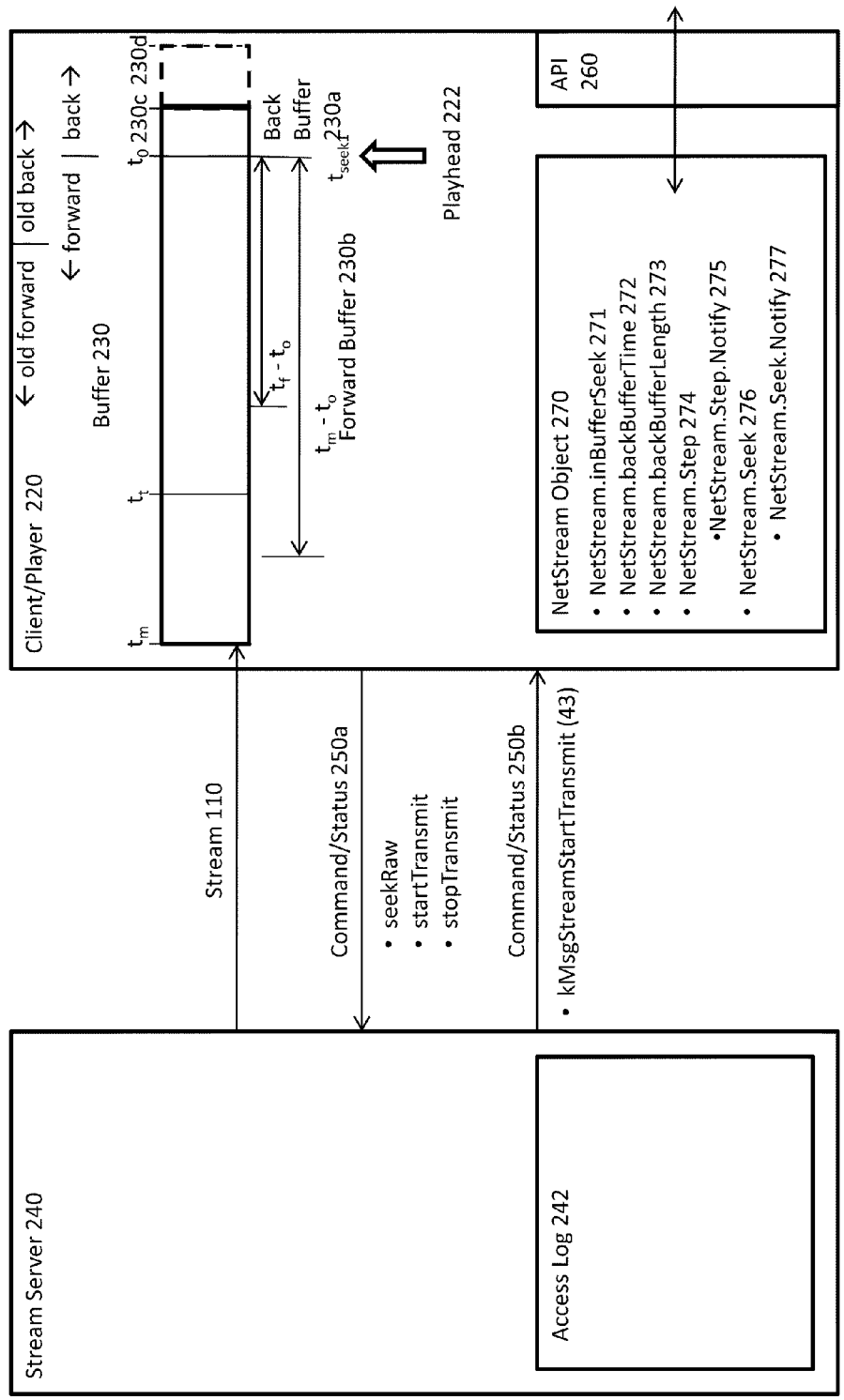
FIG. 3 illustrates a method of the technology.

Referring to FIG. 3, upon a seek into the back buffer 230a, the playhead (and $t_0$) is being set back in time to $t_0 = t_{seek1}$, the new forward time (e.g., $t_f - t_o$ 323) in the buffer may now be greater than $t_{max}$, or may be less than $t_{max}$, but close enough to $t_{max}$ that continued streaming by the server is undesirable. StopTransmit (pause state, time) is similar to the existing Pause command between the client 220 and the server 240, except that a different event will be logged in the server 240 (as described below with regard to the server 240). "Pause state" indicates whether the client is playing or pausing. "Time" indicates the last message time in the client buffer (e.g., $t_f$); this information can be used when the server 240 resumes streaming.

StartTransmit (pause state, time) is handled similar to the existing unpause command between the client 220 and the server 240, except that a different event will be logged in the server 240 (as described below with regard to the server 240). "Pause state" and "time" have the same meaning as arguments of stopTransmit.

For seek operations having a destination in the forward buffer 230, the playhead is positioned forward in time and the remaining stream information 110 in the buffer 230 is less than before the seek operation. To avoid the client 220 from running out of information 110 in the buffer 230, the client 220 sends a "startTransmit" command to server 240, the server 240 adjust the streaming position according to the time specified by the client 220 and sends data from that point.

The present technology works when the client 220 is connected to a supported server 240, otherwise attempts to seek will revert the seek to the standard seek behavior of flushing the buffer and requesting data for the new location from the server In legacy technology, the server 140 replies a seek or play command from the client with a control message 150 kMsgStreamBegin(0). Under protocols of some legacy technologies, this control message is guaranteed to reach the client before other messages. The purpose of the control message is to notify the client 120 that the server 140 is beginning to send a new set of stream data. When the client 120 receives the control message, it flushes the buffer 130.

In embodiments of the present technology, the buffer 230 is not flushed when a seek or play command is directed to a stream 110 content already in the buffer 230. The present technology can include control message 250b kMsgStreamStartTransmit. This message from the server 240 tells the client 220 that the server 240 is about to transmit data in stream 110, but does not direct the client 220 to empty the buffer 230.

The technology can include authorization events and logging in the server 240 in addition to those found in legacy servers. The primary usage of these new events is for blocking the command from the client. The fields of the additional server events are not modifiable because the action described by the event logging is driven by the client 220. For example, when the client 220 sends a "startTransmit" command to the server 240 with a start position, the client 220 expects to receive messages from the time it originally specified. Since each of the following events are established as notification and authorization events, each can be blocked in the server's authorization adapter.

The server 240 logs an E_CLIENT_SEEK event when a "seekRaw" command is sent from the client 220. The F_STREAM_SEEK_POSITION field is available for this event. Since seeking is occurring on the client 220 side when the server 240 received the "seekRaw" command, the server is not enabled to block this event. The E_CLIENT_SEEK event is for logging purposes. F_STREAM_SEEK_POSITION is the seek position on the client side 220; this field is read only.

The server 240 logs an E_START_TRANSMIT event when the client 220 sends a command to the server 240 to transmit more data when the client buffer 230 is running out of data, e.g., the forward buffer is below a threshold. The F_STREAM_POSITION field is available to log this event. F_STREAM_POSITION is the position (in millisecond) from which the client 220 wants the server 240 to start transmission. This field is read only.

The server 240 logs an E_STOP_TRANSMIT event when the client 220 has sufficient data in the buffer in order to direct the server to suspend the transmission, e.g., until a "start-Transmit" is send from the client. F_STREAM_POSITION is the position (in millisecond) of the data at the end of the client buffer 230 when a "stopTransmit" event is sent. This field is read only.

Figure 4:
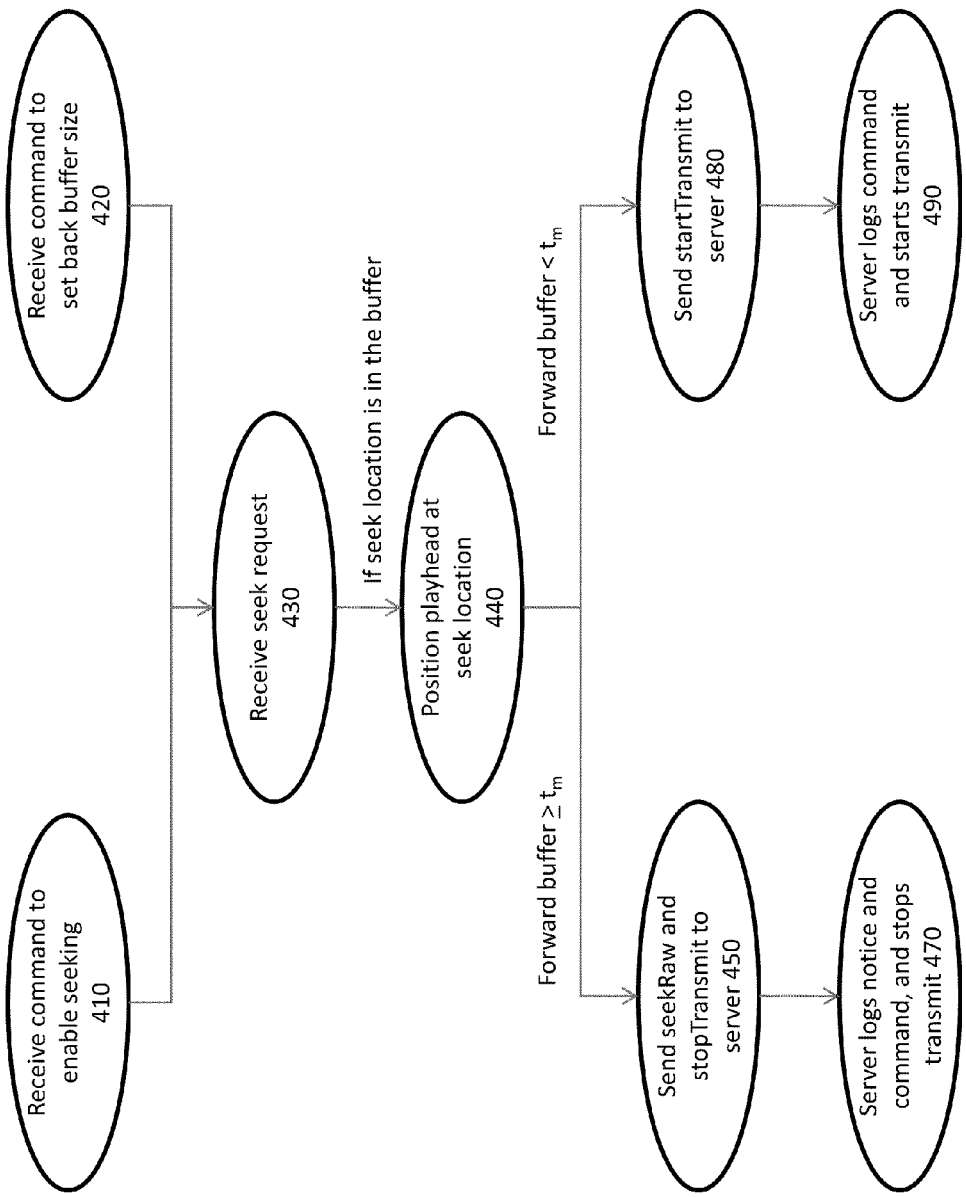
FIG. 4 illustrates methods of the technology as embodied in a computer program product.

Assuming a connection between a modified client and modified server, and referring to FIG. 4, methods of the technology as embodied in a computer program product distributed across a client data processing system and a server data processing system are illustrated, primarily from the perspective of the client 220. Via the API 260, the client 220 can be configured to enable seeking 410 within the buffer through use of the command NetStream.inBufferSeek.set (true) 271. The nominal size of the back buffer 230*a* can be configured 420 via the API 260 using the command NetStream.backBufferTime.set(x seconds) 272.

Once configured, the client 220 can receive a seek request 430 via GUI (e.g., through detecting movement of the scrubber bar), or via the API, e.g., as NetStream.Step(# frames). If the seek destination is within the buffer, then the client 220 positions the playhead 222 at the seek destination and logs the seek request 440. If the seek destination is within the buffer 230, and if the amount of data in the forward buffer 230*b* after moving the playhead is greater than or equal to a predetermined amount, e.g., $t_m$, then the client 220 sends 450 status notice seekRaw 252 and command stopTransmit 254 to the server 240. A server 240 enabled in the present technology logs 460 the status notice and command and stops transmit 470. When the data in the forward buffer falls below a predetermined amount, e.g., $t_f$, the client then sends the command 480 startTransmit 254 to the server 240. The server logs the receipt of the command and resumes transmission 490 of the stream 110.

The technology can implement modes such as fast forward (e.g., multiple forward seeks in quick succession in a loop) and rewind (e.g., back seeking in a loop). The technology can implement fast/slow motion by adjusting the display time for each displayed frame.

In some embodiments, when making a connection to a server, the player checks the capabilities of the server. If the server does not support the present technology, then the player defaults to the standard seeking behavior. If the player is connected to a server implementing the present technology, then the player can attempt the seek functions of the present technology. If the present technology is disabled or otherwise inoperable, the player can revert to standard operation.

In some embodiments, the technology is applied to multiple bits streams including multiple streams containing the same content at different bit rates, multiple synchronous streams (e.g., different camera angles with related audio components), as well as to lists of parallel and serial arranged streams.

The present technology enables functions that otherwise would be to slow to respond such as smooth fast forward play, reverse play, and fast reverse play. The technology can implement seek forward or rewind in a loop in a timer for these functions. The client can interact with the server through the "startTransmit" call to ask for more data when going forward in the buffer to provide sufficient forward buffer to continue to fast forward through the stream. In the presence of adequate bandwidth the player can fast forward through the entire length of the content without pauses because of this communication between the player and the server. The rate of fast forward can be adapted between the server and the player according to the bandwidth available to make sure there is enough buffer in the player to fast forward and not pause because of rebuffering. For example, on a fast connection the fast forward could be 5× but on a slower connection it could be 2×.

The present technology also can include systems, methods, and computer program products for frame-accurate seeking for an H.264 codec. Implementation of frame accuracy is achievable for other codecs, but in terms of H.264 codec it is hard because the way the decoder is implemented. To be able to generate a required frame exactly, an unknown number of decoded frames are needed by the H.264 decoder. This can depend on the number of CPUs/cores on the system. It can also depend on the codec parameters used while encoding the content in H.264 such as Profile and Level, which establishes the depth of buffer needed, both backwards and forwards to be able to generate a final frame for output/render on the display.

A server in this case may have insufficient knowledge on the codec properties or the configuration of the system the client is running on, so may not know how many frames to send to the client. Video editing applications are able to achieve frame accuracy in part because the media is local in the client system; so such applications have access to the data or encoded messages locally to traverse and get the right number of coded frames to generate a decoded frame.

Embodiments of the present technology can achieve this for streaming media as well. In such embodiments, the client can use the buffered data (both backward and forward) to look up and traverse the coded frames and continue decoding until it has the right frame it needs and then discard the others and then rearrange the buffer with the discarded ones to allow further frame accurate seeks to generate the right output.

This approach is facilitated when there is both a forward and back buffer on a step seek and the data is not flushed out and requested again from the server. In effect, the technology provided enough local buffer to allow video editing for precise editing for streaming media. Up to now, video editing applications as provided by current flash player implementations like mtv.com and youtube remix tools are limited in providing approximate editing. As further explanation, step seek can be relative seek from the current position based on frame units versus standard seek which can be an absolute seek in time units. As an example, in a media file of 30 frames per second if the playhead is at frame 300 and wants to go forward by 2 frames, the player can step(+2) to go to frame 302 without knowing the time at that frame. For constant bit rate video files one can calculate the time based on the frame rate. But for variable frame rate videos this is not feasible to achieve with regular seek because what time the frame 302 is at, it is not feasible to know when the system does not have a buffer or if the buffer is flushed.

To be able to render the 2nd frame forwards, a solution is to continue feeding the decoder with enough frames until it is able to decode the 2nd frame and then recover the buffer with extra frames that have been taken out of the buffer but not used so that future step seek forwards does the right thing.

The present technology can take the form of hardware, software or both hardware and software elements. In some embodiments, the technology is implemented in software, which includes but is not limited to firmware, resident software, microcode, an FPGA or ASIC, etc. In particular, for real-time or near real-time use as in a patient position monitor, an FPGA or ASIC implementation is desirable.

Furthermore, the present technology can take the form of a computer program product accessible from computer-usable or computer-readable medium providing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations.

The invention claimed is:

1. A streaming media player comprising:
   a back buffer for buffering, the back buffer:
      beginning at a stream frame most recently played by the streaming media player from a forward buffer, and
      continuing, for each played frame of the stream, for a length determined by a nominal fill and an offset, wherein:
         the offset is determined in run time by the position of a keyframe in the vicinity of the nominal fill, and
         the nominal fill is modified by the offset.

2. The streaming media player of claim 1 wherein:
   the keyframe in the vicinity of the nominal fill is a keyframe next earlier in the stream to the location of the nominal fill, and
   the back buffer continues to the keyframe next early in the stream to the location of the nominal fill.

3. The streaming media player of claim 1 wherein:
   the keyframe in the vicinity of the nominal fill is a keyframe next later in the stream to the location of the nominal fill, and
   the back buffer continues to the keyframe next later in the stream to the location of the nominal fill.

4. The streaming media player of claim 1 wherein: the keyframe is the keyframe nearest in the stream to the location of the nominal fill,
   the keyframe in the vicinity of the nominal fill is a keyframe nearest in the stream to the location of the nominal fill, and
   the back buffer continues to the keyframe nearest in the stream to the location of the nominal fill.

5. A streaming media player system comprising:
   at least one processor;
   at least one computer-readable medium:
      comprising memory elements, and
      in communication with the at least one processor; and
   program code:
      stored on the at least one computer-readable medium, and
      operative, when executed by the at least one processor, to buffer streaming media in memory elements comprising a back buffer, the back buffer:
         beginning at a stream frame most recently played by the streaming media player from a forward buffer, and
         continuing, for each played frame of the stream, for a length determined by a nominal fill and an offset, wherein:
            the offset is determined in run time, and
            the nominal fill is modified by the offset.

6. The streaming media player of claim 5 wherein:
   the offset is determined in run time by the position of a keyframe in the vicinity of the nominal fill.

7. The streaming media player of claim 5 wherein:
   the keyframe in the vicinity of the nominal fill is a keyframe next earlier in the stream to the location of the nominal fill, and
   the back buffer continues to the keyframe next early in the stream to the location of the nominal fill.

8. The streaming media player of claim 5 wherein:
   the keyframe in the vicinity of the nominal fill is a keyframe next later in the stream to the location of the nominal fill, and
   the back buffer continues to the keyframe next later in the stream to the location of the nominal fill.

9. The streaming media player of claim 5 wherein: the keyframe is the keyframe nearest in the stream to the location of the nominal fill,
   the keyframe in the vicinity of the nominal fill is a keyframe nearest in the stream to the location of the nominal fill, and
   the back buffer continues to the keyframe nearest in the stream to the location of the nominal fill.

10. A computer program product comprising:
    at least one computer-readable medium; and
    program code:
       stored on the at least one computer-readable medium, and
       operative, when executed by at least one processor, to buffer a media stream in a back buffer, the back buffer:
          beginning at a media stream frame most recently played by a streaming media player from a forward buffer, and
          continuing, for each played frame of the media stream, for a length determined by a nominal fill and an offset, wherein:
             the offset is determined in run time, and
             the nominal fill is modified by the offset.

11. The streaming media player of claim 10 wherein:
    the offset is determined in run time by the position of a keyframe in the vicinity of the nominal fill.

12. The streaming media player of claim 10 wherein:
the keyframe in the vicinity of the nominal fill is a keyframe next earlier in the stream to the location of the nominal fill, and
the back buffer continues to the keyframe next early in the stream to the location of the nominal fill.

13. The streaming media player of claim 10 wherein:
the keyframe in the vicinity of the nominal fill is a keyframe next later in the stream to the location of the nominal fill, and
the back buffer continues to the keyframe next later in the stream to the location of the nominal fill.

14. The streaming media player of claim 10 wherein: the keyframe is the keyframe nearest in the stream to the location of the nominal fill,
the keyframe in the vicinity of the nominal fill is a keyframe nearest in the stream to the location of the nominal fill, and
the back buffer continues to the keyframe nearest in the stream to the location of the nominal fill.

15. A computer-implemented method comprising:
buffering a media stream in a back buffer, the back buffer:
    beginning at a media stream frame most recently played by a streaming media player from a forward buffer, and
    continuing, for each played frame of the media stream, for a length determined by a nominal fill and an offset, wherein:
        the offset is determined in run time, and
        the nominal fill is modified by the offset.

16. The method of claim 15 wherein:
the offset is determined in run time by the position of a keyframe in the vicinity of the nominal fill.

17. The method of claim 15 wherein:
the keyframe in the vicinity of the nominal fill is a keyframe next earlier in the stream to the location of the nominal fill, and
the back buffer continues to the keyframe next early in the stream to the location of the nominal fill.

18. The method of claim 15 wherein:
the keyframe in the vicinity of the nominal fill is a keyframe next later in the stream to the location of the nominal fill, and
the back buffer continues to the keyframe next later in the stream to the location of the nominal fill.

19. The method of claim 15 wherein: the keyframe is the keyframe nearest in the stream to the location of the nominal fill,
the keyframe in the vicinity of the nominal fill is a keyframe nearest in the stream to the location of the nominal fill, and
the back buffer continues to the keyframe nearest in the stream to the location of the nominal fill.

\* \* \* \* \*